July 5, 1960

N. J. BROOK 2,943,894

SKID PROOF BEARING

Filed Feb. 10, 1954

INVENTOR
NILES J. BROOK
BY Charles A. Warren
ATTORNEY

United States Patent Office 2,943,894
Patented July 5, 1960

2,943,894

SKID PROOF BEARING

Niles J. Brook, East Hartford, Conn., assignor to United Aircraft Corporation, East Hartford, Conn., a corporation of Delaware Filed Feb. 10, 1954, Ser. No. 409,424

11 Claims. (Cl. 308—212)

This invention relates to anti-friction bearings and more specifically to roller bearings in which skidding of the individual roller is minimized.

Under certain conditions, especially in high speed anti-friction bearings, there may be slipping between the rollers and one or another of the races. This slipping most frequently occurs when the bearing is lightly loaded or possibly overloaded. Such slipping results in rapid wear on the rollers and raceways and reduces the life of the bearing. One feature of the invention is an arrangement by which to assure contact between the rollers and the raceways regardless of the amount or direction of the load on the bearing. One feature of the invention is a bearing arrangement in which one of the races is out of round, so that there is an interference fit between the rollers and the races at circumferentially spaced points.

One of the reasons for the slippage is believed to be the fact that, under certain conditions, the cage is not moving fast enough so that the races skid over the roller surfaces in attempting to accelerate the rollers and cage to the necessary rotative speed. One feature of the invention is an arrangement by which to make sure that the cage is moving at the proper circumferential speed so that skidding between the bearings and the races will be kept at a minimum.

Other features and advantages will be apparent from the following detailed description in connection with the accompanying drawings in which.

Figure 1:
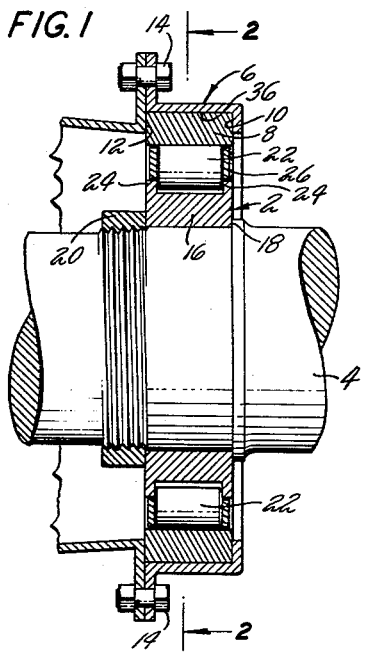
Fig. 1 is a sectional view through a bearing embodying the invention.

The invention is shown in a bearing 2 which provides a support for a shaft 4 within a supporting housing 6. The bearing consists of an outer race ring 8 clamped between shoulders 10 and 12 of the housing 6. The latter may be in two parts held together by bolts 14 to permit positioning of the outer race within the housing. The bearing also has an inner race ring 16 positioned on the shaft 4 and clamped between a shoulder 18 on the shaft and a locking nut 20. The races are held in spaced relation by rollers 22.

The rollers 22 are positioned between and engage the inner and outer races on the raceways or bearing surfaces and one of the races, for example, the race 16, has projecting flanges 24 by which to limit axial movement of the rollers with respect to the race. The rollers are circumferentially spaced within the bearing by a cage 26 which during operation of the bearing, is caused to rotate at the same speed as the individual rollers rotate about the axis of the shaft. For the purpose of making sure that there is contact between the races and the rollers, at least at spaced circumferential points, one of the races is made out-of-round so that the clearance between the inner and outer races at certain circumferentially spaced points will be an interference fit with the rollers. By interference fit is meant that the dimension between the roller engaging surfaces of the races, at the points where the interference fit occurs, is less than the diameter of the roller by from 1 to 2 thousandths of an inch per inch of diameter of the bearing.

Figure 2:
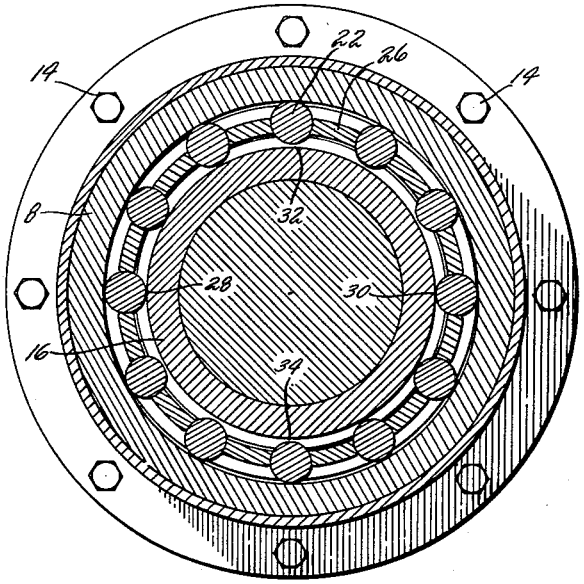
Fig. 2 is a sectional view substantially at right angles to Fig. 1, substantially along the line 2—2 of Fig. 1.
Figure 3:
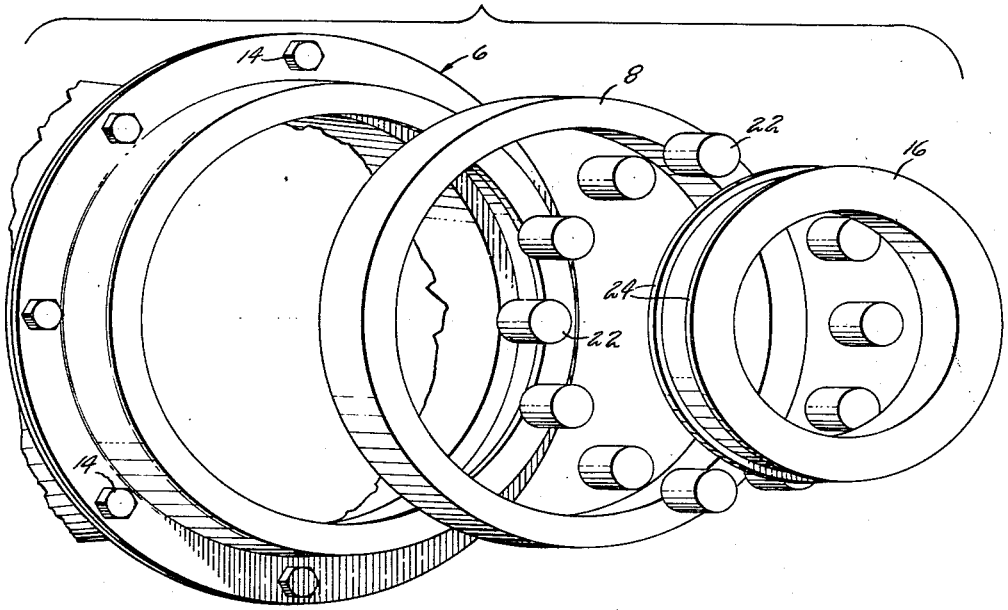
Fig. 3 is a view of the several parts separated from each other to show the invention more clearly.

To obtain the interference fit at spaced points around the periphery of the row of rollers either the inner or outer raceway engaging the rollers may be finished to an out-of-round shape as for example an elliptical shape to provide, as shown in Fig. 2, diametrically spaced points 28 and 30 at which there is an interference fit, and other diametrically spaced points 32 and 34 at which there is clearance between the rollers and the raceways.

An alternative method by which to produce the interference fit is to distort one of the races, the outer race, in the arrangement shown, as by placing a jack inside the race and spreading it into substantially an elliptical shape. The outer surface, that is the surface opposite to the roller engaging raceway is then machined round, while the race is distorted, so that, when the jack is removed, the race will return to a shape such that the raceway is circular and the opposite surface substantially elliptical.

The bearing is then assembled and is placed in the supporting housing 6. The latter is rigid enough so that the cylindrical opening 36 therein, which receives the outer race 8 will hold it so that the outer surface of the race is cylindrical thus distorting the race such that the raceway therein is elliptical and produces the circumferentially spaced interference fits. The housing 6 holds the race 8 in its distorted form but is sufficiently flexible so that the race may be sprung slightly as the rollers pass the places where the interference fits occur in order that the rollers may pass these points without stressing the rollers or the raceways enough to damage either the rollers or the raceways.

The raceway of the outer race has previously been accurately machined to the usual dimension provided in roller bearings to provide the normal fit between the raceways and the rollers before any steps are taken to produce the out-of-roundness and the interference fit.

With this arrangement, the rollers are always in positive rolling contact with the raceways at circumferentially spaced points, even when the shaft is free of any radial loading, and positive rotation of the rollers is thereby assured. This rotation of the rollers, both on their own axis and on the axis of the bearing also assures rotation of the cage at the required speed so that skidding of the rollers on the raceways is reduced to a minimum.

Although the description has been directed to roller bearings it will be understood that the arrangement may be applicable to other types of anti-friction bearings such as ball bearings and other bearing shape variations.

It is to be understood that the invention is not limited to the specific embodiment herein illustrated and described, but may be used in other ways without departure from its spirit as defined by the following claims.

I claim:

1. A bearing construction including an inner race ring, an outer race ring, and anti-friction bearing members between said rings and engaging a surface on each of said rings, one of said rings having its member engaging surface out-of-round such that, at a plurality of circumferentially spaced points thereon, the spacing between the member engaging surfaces of said rings is slightly less than the comparable dimension of the member, one of said rings being resilient to permit distortion of the ring as the members pass said spaced points.

2. A bearing construction including an inner race ring, an outer race ring, and anti-friction bearing members between said rings and engaging a surface on each of said rings, one of said rings having its member engaging surface out-of-round such that, at a plurality of circumferentially spaced points thereon, the spacing between the member engaging surfaces of said rings is slightly less than the comparable dimension of the member, the out-of-round ring being resilient such that the ring may be distorted to permit the members to pass said spaced points.

3. A bearing construction including an inner ring, an outer ring, and rollers between said rings and engaging a surface on each of said rings, one of said rings having its roller engaging surface out-of-round such that at a plurality of spaced points circumferentially of said surface there is an interference fit with the rollers, the out-of-round ring being resilient such that the ring may be distorted to allow the rollers to pass said spaced points.

4. A bearing construction including an inner race ring, an outer race ring, and anti-friction bearing members between said rings and engaging surfaces thereon, one of said rings having its member engaging surface out-of-round such that, at a plurality of circumferentially spaced points thereon, the spacing between the member engaging surfaces of said rings is slightly less than the comparable dimension of the member to provide an interference fit, the out-of-round ring being of such resilience that the ring will be distorted by the rollers as they pass the points of interference fit.

5. A bearing construction including an inner ring, an outer ring, and rollers between said rings, said outer ring having its outer surface out-of-round, and a supporting structure having a cylindrical recess receiving said ring, the dimensions and stiffness of said supporting structure being such that the ring will be distorted when assembled with the structure to produce a substantially cylindrical outer surface and an out-of-round inner surface.

6. A bearing construction including an inner ring, an outer ring, and rollers between said rings, said outer ring having its outer surface out-of-round, and a supporting structure having a cylindrical recess receiving said ring, the dimensions and stiffness of said supporting structure being such that the ring will be distorted when assembled with the structure to produce a substantially cylindrical outer surface and an out-of-round inner surface presenting at least two cusps around the periphery.

7. A bearing construction including an inner ring, and inner structure supporting said ring, an outer ring and an outer structure supporting said outer ring, and anti-friction members between said rings and adapted to roll therebetween as one of the rings rotates relative to the other, said members engaging with an inner surface of said outer ring and an outer surface of said inner ring, and a cage supporting the members in circumferentially spaced relation and rotatable with respect to said rings, one of said rings having its surface opposite to the member engaging surface of said one of said rings made out-of-round, and the corresponding supporting surface for said one of said rings being round such that when the out-of-round ring is placed on its supporting structure the ring will be distorted to produce circumferentially spaced cusps on the member engaging surface, the spacing between the member engaging surfaces on the rings at said cusps being less than the corresponding dimension of the members.

8. A bearing construction including an inner ring, and inner structure supporting said ring, an outer ring and an outer structure supporting said outer ring, and anti-friction members between said rings and adapted to roll therebetween as one of the rings rotates relative to the other, said members engaging with an inner surface of said outer ring and an outer surface of said inner ring, and a cage supporting the members in circumferentially spaced relation and rotatable with respect to said rings, one of said rings having its surface opposite to the member engaging surface of said one of said rings made out-of-round, and the corresponding supporting surface for said one of said rings being round such that when the out-of-round ring is placed on its supporting structure the ring will be distorted to produce circumferentially spaced cusps on the member engaging surface, the spacing between the member engaging surfaces on the rings at said cusps being less than the corresponding dimension of the members, the supporting structure for said out-of-round ring being resilient enough to permit distortion of the ring by the members such that they may pass the cusps as one of the rings rotates relative to the other.

9. In the production of a roller bearing the steps of producing an inner ring having its inner surface concentric with its outer roller engaging surface, producing an outer ring with a cylindrical inner roller engaging surface, distorting said outer ring into substantially elliptical shape, forming a cylindrical outer surface on said distorted ring, positioning rollers between said rings to form a bearing, and subsequently assembling said outer ring in a cylindrical opening in a supporting structure much more rigid than the ring but sufficiently flexible to provide for distortion of said structure as the rollers move between the rings such that the outer ring is held in the distorted condition within the supporting structure to provide spaced points in the bearing path where the rings have an interference fit with the rollers.

10. In the production of a roller bearing the steps of producing an inner ring having its inner surface concentric with its outer roller engaging surface, producing an outer ring with a cylindrical inner roller engaging surface, distorting said outer ring, forming a cylindrical outer surface on said distorted ring, positioning rollers between said rings to form a bearing, providing a supporting structure having a cylindrical ring receiving opening, and being more rigid than the ring, subsequently assembling said outer ring in the cylindrical opening, with the supporting structure holding the ring in its distorted condition, thereby producing an interference fit between the rollers and the bearing rings at spaced circumferential points.

11. In the production of a roller bearing the steps of producing an inner ring having its inner surface concentric with its outer roller engaging surface, producing an outer ring with a cylindrical inner roller engaging surface, temporarily distorting said outer ring, forming a cylindrical outer surface on said distorted ring, positioning rollers between said rings to form a bearing, mounting said assembled bearing in a supporting structure having a cylindrical outer ring receiving opening, and being more rigid than the ring, but sufficiently flexible to provide for distortion of said structure as the rollers move between the rings.

References Cited in the file of this patent

UNITED STATES PATENTS

| | | |
|---|---|---|
| 1,334,027 | Forsberg | Mar. 16, 1920 |
| 1,660,506 | Hamilton | Feb. 28, 1928 |
| 1,978,707 | Gibbons | Oct. 30, 1934 |
| 1,984,718 | Wistrand | Dec. 18, 1934 |
| 2,118,317 | Mader | May 24, 1938 |
| 2,559,621 | Hill | July 10, 1951 |

FOREIGN PATENTS

| | | |
|---|---|---|
| 250,412 | Great Britain | Apr. 15, 1926 |
| 837,249 | France | Nov. 3, 1928 |